(No Model.) 2 Sheets—Sheet 2.
A. L. BARON, W. T. RUFER & B. F. COCKAYNE.
LANTERN.
No. 252,642. Patented Jan. 24, 1882.
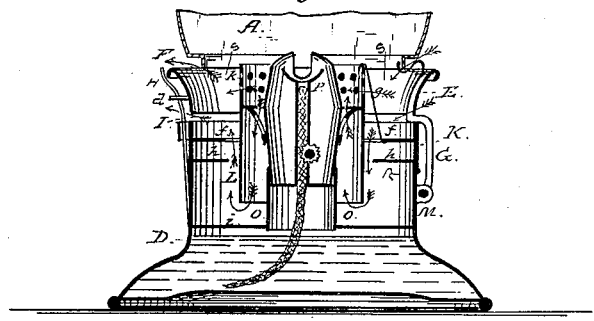
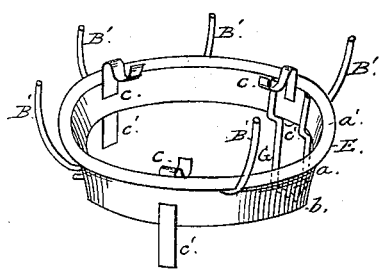
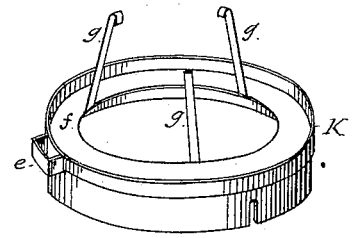
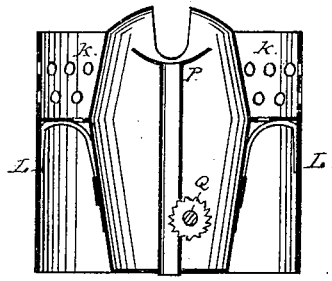
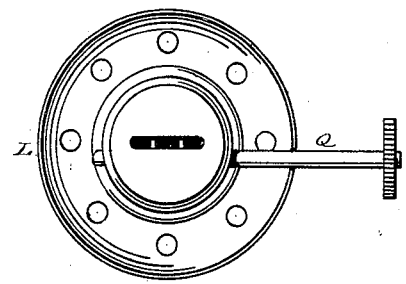
Attest:
F. W. Howard
John C. Schroeder
Inventors,
Alfred L. Baron
William T. Rufer
Benjamin F. Cockayne
by Dyer & Wilber Attys

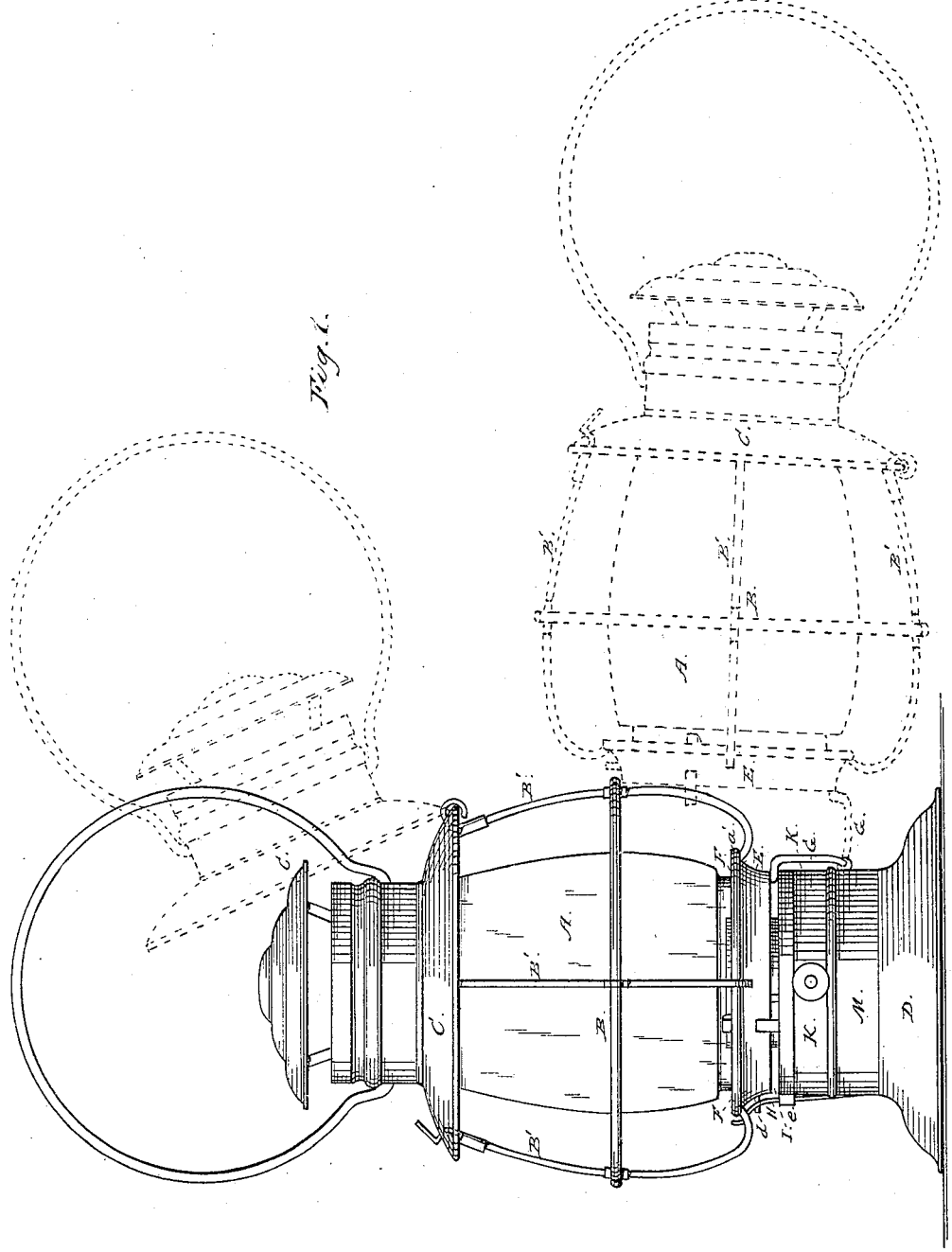

UNITED STATES PATENT OFFICE.

ALFRED L. BARON, WILLIAM T. RUFER, AND BENJAMIN F. COCKAYNE, OF BELLAIRE, OHIO.

LANTERN.

SPECIFICATION forming part of Letters Patent No. 252,642, dated January 24, 1882.

Application filed August 23, 1881. (No model.)

*To all whom it may concern:*

Be it known that we, ALFRED L. BARON, WILLIAM T. RUFER, and BENJAMIN F. COCKAYNE, all of Bellaire, in the county of Belmont, and State of Ohio, have invented a new and useful Improvement in Lanterns; and we do hereby declare that the following is a full and exact description of the same, reference being had to the accompanying drawings, and to the letters of reference marked thereon.

Our invention belongs to the class of lanterns which hold their light under all exposures to wind, or to violent agitations, and is intended as an improvement upon the single-globe lantern described in the Letters Patent numbered 242,814, granted June 14, 1881, to Fred. Sumner Clinton.

The particular improvements over the lantern described in said Letters Patent consist, principally, in interposing an additional dividing-band between the upper base-band and the bottom of the globe, leaving free open air-spaces between the bottom of the globe and the upper portion of such dividing-band, and another free open air-space between the lower portion of such dividing-band and the top of the upper base-band, said dividing-band also carrying supports upon which the globe rests, and having the lower part of the globe-guard attached to it; also, in dispensing with the perforated annular supporting-plate described in said Letters Patent; also, in making such upper base-band removable, providing it with an ear through which the locking-spring passes, keeping it always in proper position, and in attaching to its annular plate spring-hooks which hold and keep the burner-guard cylinder in proper vertical position; also, in supporting said burner-guard cylinder above the top of the oil-reservoir, leaving a clear open space between the top of the oil-reservoir and the bottom of the burner-guard cylinder, instead of having the bottom of said cylinder perforated and resting upon the top of the oil-reservoir, as in said Letters Patent; also, in hinging the upper part of the lantern to the base in such a manner that the lantern, when opened, may rest upon a plane surface without tilting the base, while the hinge, when the lantern is closed together with the locking-spring, serves to keep the dividing-band at a proper distance from the upper base-band. All these improvements are for the purpose of making a more convenient and efficient lantern for use under all circumstances.

The novelties in our lantern are as follows, viz: in the dividing-band of itself, and in its various operative combinations; in the upper base-band, with its attachments; in the method of hinging the lantern; in the method of locking or binding the several parts together, and in a novel globe-guard to which the reflector is hinged, the several parts constructed and arranged to operate as more fully hereinafter described.

In order that others may know how to make our lantern, a more full description of its several parts is now given in connection with the accompanying drawings, in which—

Figure 1 is an elevation, the position of the upper part, when the lantern is opened, being shown in dotted lines; Fig. 2, a vertical central section of the lower part of the lantern; Fig. 3, a separate view of the dividing-band and its attachments; Fig. 4, a separate view of the upper base-band and its attachments; Fig. 5, a vertical central section of the burner-guard cylinder and inclosed burner, and Fig. 6 a bottom view of the same.

Like letters denote the same parts in each figure, and the arrows designate the direction of air-currents.

In our lantern, A represents any proper globe; B, the globe-guard; C, the top of the lantern, hinged to the guard in such a way that when opened the globe may be removed or replaced conveniently, and when closed will hold the globe in its proper position; D, the base of the lantern, in each of which parts, except the globe-guard, our lantern has no novelty. The globe-guard has no wire around a part or all of its top, as usual. It has preferably five vertical bars, B'. Two of these have hooked tops or hooks at their tops, to which one edge of the reflector is hinged. One of these vertical bars has its top formed into a spring-catch, or has a spring-catch attached to it, which passes through a suitable opening in the reflector.

To the bottom of the guard the dividing-band E is secured. This band is annular, is contracted regularly from its top $a$ to its bottom $b$, and has its top turned over outwardly in a curved flange, $a'$. It has secured upon its inner surface supports $c\ c\ c$, bent upwardly and inwardly, so as to receive and support the bottom of the globe centrally within the dividing-band, so that such bottom of the globe will be about on a line horizontally with the top $a$ of the dividing-band, and a clear open air-space, F, will be left all around between the bottom of the globe and the top of the dividing-band. We have found upon trial that a width on a horizontal line of this air-space of little more than a quarter of an inch is most effective in a lantern of usual commercial size; but this space may be increased or diminished considerably without destroying the operation of the lantern.

The supports $c\ c\ c$ may be extended below the bottom of the dividing-band, as at $c'\ c'\ c'$, and these portions serve as supports to preserve the band in a proper horizontal plane and at a suitable distance above the upper base-band, or the parts $c'\ c'\ c'$ may be separate pieces of metal, or they may be dispensed with altogether. To the inner side of this dividing-band the ends of the hinge G are attached. The ends of this hinge, made of stout wire and separated considerably, pass along the inner wall of the dividing-band, and are bent outwardly under the bottom of the same and then downwardly where the loop portion turns in a suitable ear or sleeve secured to the lower base-band. Thus this hinge, by passing outwardly under the bottom of the dividing-band, serves to separate the same from the upper base-band, and to hold it firmly in proper position, in which offices it is assisted by the pin $d$, upon which the locking-spring H engages, and there is thus provided a second clear open air-space, I, between the bottom of the dividing-band and the top of the upper base-band, K, which air-space is preferably about one-eighth of an inch in vertical width.

The bottom of the dividing-band is preferably of about the same diameter as the top of the upper base-band, while the top of such dividing-band is of greater diameter than the top of the upper base-band.

The upper base-band, K, has upon one side an ear, $e$, by means of which it is threaded upon the locking-spring H, and thus held always in proper position. It has also a horizontal annular plate, $f$, secured to its inner walls a little below the top, and to the inner edge of this plate it has secured spring-hooks $g\ g\ g$, adapted to engage with the top of the burner-guard cylinder L and assist in holding it in a vertical position.

The lower base-band, M, is of a size to permit a portion of the upper base-band to slip closely over it, and has secured to it the locking-spring H and the ear or sleeve in which the hinge G turns, as before mentioned. This base-band M has also its horizontal annular plate $h$ secured to its inner walls a little below its top. Within this plate $h$ the burner-guard cylinder L is held centrally with its bottom a little above the top $i$ of the oil-reservoir, so that there is a free open air-space, O, between the top of the oil-reservoir and the bottom of the burner-guard cylinder. This cylinder is held in position by the lower end of the burner entering the top of the oil-reservoir in the fashion of a plug or stopper, and by the ratchet-rod resting upon the top of the lower base-band, and by the spring-hooks before mentioned. This cylinder is perforated at its top, as shown at $k$, below the root of the flame, and has secured within it the burner P, and through one of its walls the wick-ratchet rod Q passes.

When the lantern thus described has all of its parts in position there is formed between the top of the oil-reservoir and the inner walls of the upper and lower base-bands and the dividing-band an air-chamber, R, having extending horizontally into it the annular plates $f$ and $h$, connecting directly with the open air through the passages F and I, and with the interior of the burner, through the passage O, with the exterior of the burner by the perforations in the guard-cylinder at $k$, and with the interior of the globe through the clear open space S, between the bottom of the globe and the top of the burner-guard cylinder. Thus this chamber, which receives the air for combustion and is most intimately connected with the burner, has openings in all directions, whereby air for combustion is always supplied continually and in sufficient quantities, and air in excess of supply for combustion has as many avenues of escape as of entrance. This result is enhanced by the projection of the reflector-plate of the top, by the curved flange of the dividing-band, and by the slope of the walls of the latter, owing to its contraction downwardly.

Having thus described our invention, what we claim as new therein is—

1. In a lantern, the dividing-band E, located between the globe and upper base-band, outside the former, substantially as described, and for the purpose set forth.

2. In a lantern, the dividing-band E, in combination with the air-passages F and I, substantially as described and shown.

3. In a lantern, the combination of the globe, the air-passages F and I, and the dividing-band E, substantially as described and shown.

4. In a lantern, the combination of the globe, the air-passages F and I, the dividing-band E, and the air-chamber R, substantially as described and shown.

5. In a lantern, the combination of the air-chamber R, the dividing-band E, and the air-passages F and I, O and S, constructed and arranged substantially as described and shown.

6. In a lantern, the dividing-band E, provided with globe-supports $c\ c\ c$, substantially as described and shown.

7. In a lantern, the dividing-band E, combined with the globe-guard, substantially as described and shown.

8. In a lantern, the dividing-band E, combined with the globe-guard and the hinge G, substantially as described and shown.

9. In a lantern, the upper base-band, K, with its ear e, combined with the locking-spring H, substantially as described.

10. In a lantern, the upper base-band, K, with its hooks g g g, and the burner guard-cylinder L, substantially as described.

11. In a lantern, the guard B, without a top wire in whole or part, and with vertical rods B', the upper ends of which are adapted to hinge and lock the reflector, the several parts constructed and arranged substantially as described and shown.

12. In a lantern, the combination of the following elements, viz: a single globe supported only upon detached supports, a dividing-band, an air-passage below such band, an air-chamber below such globe, unobstructed openings into such air-chamber from the interior of the globe and from the external air, and obstructed passages from such air-chamber into the interior of the burner, the several elements constructed and arranged substantially as described and shown.

This specification signed and witnessed.

ALFRED L. BARON.
 WILLIAM T. RUFER.
 BENJAMIN F. COCKAYNE.

Witnesses:
 JOHN C. SCHROEDER,
 F. W. HOWARD,
 OWEN REILLY, Jr.,
 D. W. COOPER.